United States Patent
Shen et al.

(10) Patent No.: US 9,059,638 B2
(45) Date of Patent: Jun. 16, 2015

(54) CONTROL METHODS AND APPARATUSES FOR SWITCHING MODE POWER SUPPLIES

(71) Applicant: Leadtrend Technology Corporation, Hsinchu (TW)

(72) Inventors: Yi-Lun Shen, Taipei (TW); Yu-Yun Huang, New Taipei (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 98 days.

(21) Appl. No.: 13/833,475

(22) Filed: Mar. 15, 2013

(65) Prior Publication Data

US 2014/0009974 A1    Jan. 9, 2014

(30) Foreign Application Priority Data

Jul. 4, 2012 (TW) .............................. 101123953 A

(51) Int. Cl.
  *H02M 3/156* (2006.01)
  *H02M 3/335* (2006.01)
  *H02M 1/08* (2006.01)
  *H02M 1/00* (2006.01)

(52) U.S. Cl.
  CPC ...... *H02M 3/33515* (2013.01); *H02M 3/33507* (2013.01); *H02M 1/08* (2013.01); *H02M 2001/0003* (2013.01); *H02M 2001/0009* (2013.01)

(58) Field of Classification Search
  CPC . H02M 3/33515; H02M 7/217; H02M 3/335; H02M 2001/0009; H02M 3/156; H02M 3/1588; H02J 7/0072; Y02B 70/1466
  USPC ................. 323/271, 274, 277, 280, 282–288; 363/21.1–21.18, 56.01
  See application file for complete search history.

(56) References Cited

U.S. PATENT DOCUMENTS

| | | | |
|---|---|---|---|
| 6,858,996 B2* | 2/2005 | Green | 315/291 |
| 8,279,631 B2* | 10/2012 | Yang | 363/20 |
| 2010/0157636 A1* | 6/2010 | Li et al. | 363/124 |

* cited by examiner

*Primary Examiner* — Adolf Berhane
*Assistant Examiner* — Yemane Mehari
(74) *Attorney, Agent, or Firm* — McClure, Qualey & Rodack, LLP

(57) ABSTRACT

Embodiments disclose control methods and control apparatuses for a switched mode power supply. The switched mode power supply comprises a current-controllable device. A driving current is provided to turn ON the current-controllable device. A conduction current passing through the current-controllable device is detected. The driving current is controlled according to the conduction current. The higher the conduction current the higher the driving current.

24 Claims, 3 Drawing Sheets

CONTROL METHODS AND APPARATUSES FOR SWITCHING MODE POWER SUPPLIES

CROSS-REFERENCE TO RELATED APPLICATION

This application claims priority to and the benefit of Taiwan Application Series Number 101123953 filed on Jul. 4, 2012, which is incorporated by reference in its entirety.

BACKGROUND

The present disclosure relates generally to switched mode power supplies, more particularly to the switched mode power supplies using current-controllable devices as power switches.

Switched mode power supplies commonly utilize power switches to control the current flowing through inductive devices. In comparison with other kinds of power supply, switched mode power supplies usually enjoy compact size and excellent conversion efficiency, and are accordingly welcome in the industry of power supplies Bipolar junction transistor (BJT), a kind of power switch, excels in simple device structure, cheap price, and low conduction loss, such that it is well adopted in low cost applications. Unlike a metal-oxide-semiconductor transistor (MOS), which is another kind of power switch and is driven according to its gate voltage, a BJT is a current-controllable device, requiring a current control apparatus to control the base current $I_b$ flowing through the base electrode of the BJT. Base current $I_b$ and collector current $I_c$ merge together to become emitter current $I_e$. The difference between emitter current $I_e$ and collector current $I_c$ could render, in a power supply, mismatch of output regulation or misjudgment for abnormal events. Furthermore, the switching speed of a BJT is known to be slower than that of a MOS, and it is desired in the art of circuit design of switched mode power supplies to quickly turn ON and OFF a BJT.

In this specification, the devices or apparatuses share the same reference characters have the same or similar function, structure, or characteristic, and can be obviously derived by a person skilled in the art based on the teaching herein. It is not required that they are exactly identical, however, and some might not be redundantly explained in consideration of brevity.

SUMMARY

Embodiments of the present invention disclose a control method for a switched mode power supply. The switched mode power supply comprises a current-controllable device. A driving current is provided to turn ON the current-controllable device. A conduction current passing through the current-controllable device is detected. The driving current is controlled according to the conduction current. The higher the conduction current the higher the driving current.

Embodiments of the present invention disclose a control apparatus for driving a current-controllable device. The control apparatus has a driver and a signal converter. The driver provides a driving current to the current-controllable device. The signal converter provides a control signal according to a conduction current passing through the current-controllable device. The driving current is generated according to the control signal. The higher the conduction current the higher the control signal and the driving current.

Embodiments of the present invention disclose a control method apt to a driver with a high-side driver and a low-side driver, commonly driving a power switch. The low-side driver is kept as disabled while using the high-side driver to turn ON the power switch. The driver is made to enter a dead time when the high-side and low-side drivers are both disabled. The dead time is terminated according to a conduction current passing through the power switch. After the dead time, the high-side driver is kept disabled and the low-side driver is used to turn OFF the power switch.

Embodiments of the present invention disclose a controller for driving a power switch. The controller includes a driver, a control logic and a condition decider. The driver has a high-side driver and a low-side driver, respectively turning ON and OFF the power switch. The control logic controls the driver. The condition decider is coupled to the control logic, for terminating a dead time according to a conduction current passing through the power switch. During the dead time, both the high-side and low-side drivers are disabled, not driving the power switch.

BRIEF DESCRIPTION OF THE DRAWINGS

The invention can be more fully understood by the subsequent detailed description and examples with references made to the accompanying drawings, wherein.

DETAILED DESCRIPTION

Figure 1:
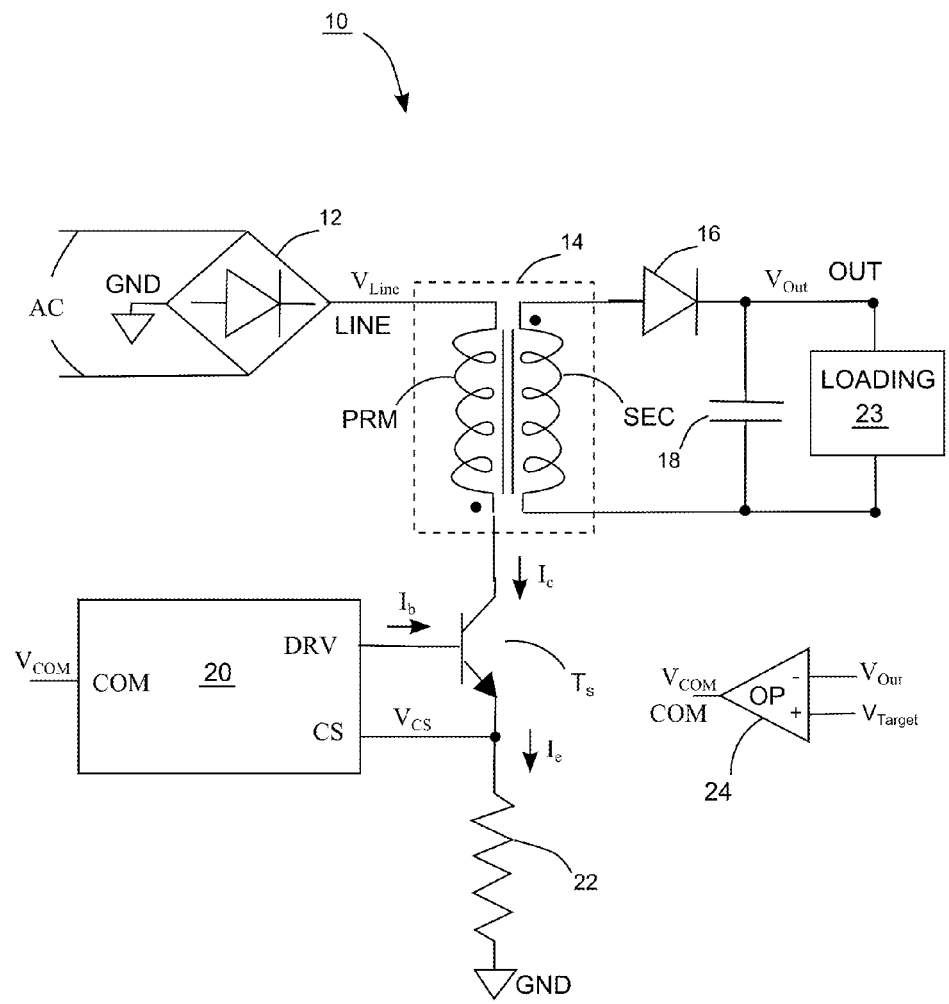
FIG. 1 shows a switched mode power supply 10 according to embodiments of the invention.

FIG. 1 shows a switched mode power supply 10 according to embodiments of the invention. The switched mode power supply 10 has a topology of flyback converter, but the invention is not limited to. The invention could be applicable to a booster or a buck converter, for example.

A bridge rectifier 12 performs full-wave rectification, converting alternative-current (AC) power source from grid lines into direction-current DC line voltage $V_{LINE}$ over high power line LINE and ground line GND. Connected in series between the high power line LINE and the ground line GND are the primary winding PRM of a transformer 14, a BJT $T_S$, and a current-sense resistor 22. The BJT $T_S$ controls the collector current $I_C$ flowing through the primary winding PRM. During ON time when BJT $T_S$ is ON and performs a short circuit, the collector current $I_C$ ramps up over time, the transformer 14 energizing. During OFF time when BJT $T_S$ is OFF and performs an open circuit, the magnetic energy stored in the transformer 14 is gradually released through the secondary winding SEC and a diode 16 to charge output capacitor 18, to build up output voltage $V_{OUT}$, and to power the loading 23. An operational amplifier 24 generates compensation voltage $V_{COM}$ on a compensation node COM, based on the difference between the output voltage $V_{OUT}$ and a predetermined target voltage $V_{Target}$, such that the output voltage $V_{OUT}$ controls the compensation voltage $V_{COM}$.

The current-sense voltage $V_{CS}$ on a current-sense node CS represents the emitter current $I_e$, which substantially flows through the current-sense resistor 22. In case that the collector current $I_C$ is very much larger than the base current $I_b$, the emitter current $I_e$ seemingly equals the conduction current flowing into the collector of the BJT $T_S$ and through the primary winding PRM. A pulse width modulator 20, by way of sensing the current-sense voltage $V_{CS}$, detects the conduction current through the BJT $T_S$. Based on the current-sense voltage $V_{CS}$ and the compensation voltage $V_{COM}$, the pulse width modulator 20 modulates the duty cycle of BJT $T_S$. What is varied for the modulation is the ON time, the OFF time, or the operation frequency of the BJT $T_S$, in individual or in combination. In one embodiment of the invention, for example, both the operation frequency and the ON time of the BJT $T_S$ increase when the compensation voltage $V_{COM}$ rises.

Figure 2:
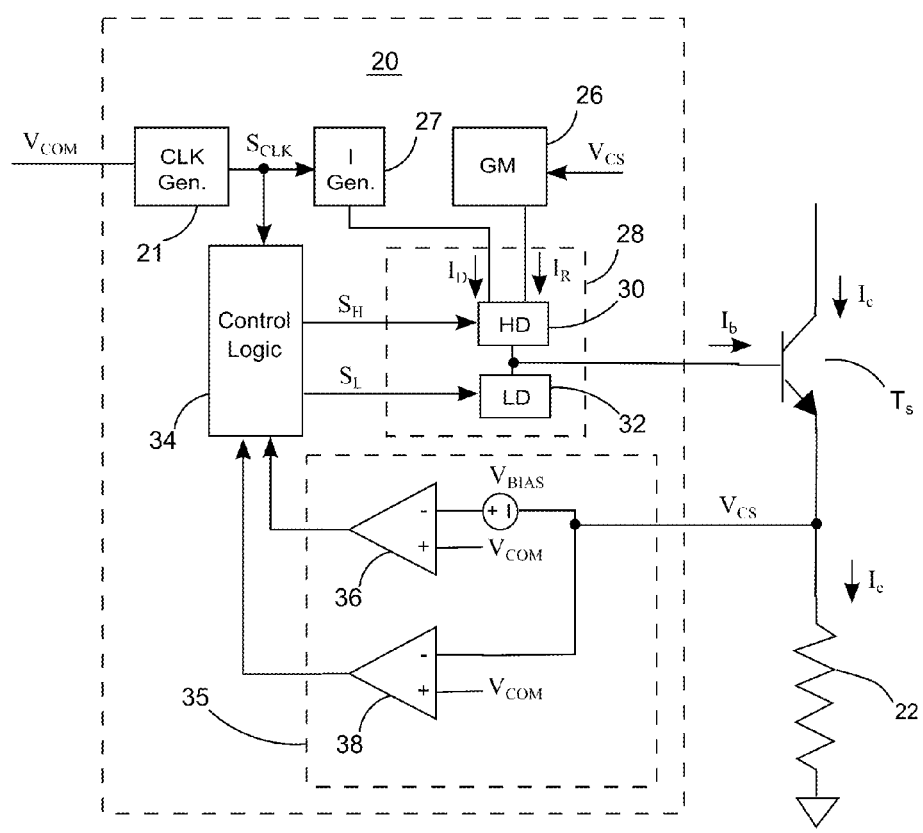
FIG. 2 exemplifies the pulse width modulator together with the BJT and the current-sense resistor in FIG. 1.

FIG. 2 exemplifies the pulse width modulator 20 together with the BJT $T_S$ and the current-sense resistor 22. Inside the pulse width modulator 20 are a clock generator 21, a current generator 27, transconductor 26, a BJT driver 28, a control logic 34, and a condition decider 35.

The clock generator 21, based on the compensation voltage $V_{COM}$, provides clock signal $S_{CLK}$ to periodically turn the BJT $T_S$ ON. A high-side driver 30 and a low-side driver 32 are in the BJT driver 28, together driving the base electrode of the BJT $T_S$. The driving current the high-side driver 30 provides raises the base voltage of the BJT $T_S$, and that the low-side driver 32 provides lowers it. In one perspective, the high-side driver 30 and the low-side driver 32 are in charge of turning ON and OFF the BJT $T_S$, respectively. The transconductor 26 is a kind of signal converter, converting the current-sense voltage $V_{CS}$ to a ratio current $I_R$. In one embodiment, $I_R = g_m \times V_{CS}$, where $g_m$ is the transconductance of the transconductor 26. The clock signal $S_{CLK}$ from the clock generator 21 decides the timings when the current generator 27 provides and varies an offset current $I_D$, which will be detailed later. The ratio current $I_R$ and the offset current $I_D$ together flow to the high-side driver 30. The control logic 34, synchronized by the clock signal $S_{CLK}$, periodically enables the high-side driver 30 to turn ON the BJT $T_S$. The control logic 34 uses signals $S_H$ and $S_L$ to control the high-side driver 30 and the low-side driver 32, respectively. When enabled by signal $S_H$, for example, the high-side driver 30 provides a driving current to turn ON the BJT $T_S$. When disabled by signal $S_H$, the high-side driver 30 provides no driving current to the BJT $T_S$. Similarly, a driving current is provided to turn OFF the BJT $T_S$ when the low-side driver 32 is enabled, and it vanishes when the low-side driver is disabled.

The condition decider 35 shown in FIG. 2 has two comparators 36 and 38. The comparator 38 compares the compensation voltage $V_{COM}$ with the current-sense voltage $V_{CS}$; and the comparator 36 does the compensation voltage $V_{COM}$ with the sum of the current-sense voltage $V_{CS}$ and a predetermined bias voltage $V_{BIAS}$. As the current-sense voltage $V_{CS}$ represents the emitter current $I_e$ flowing away from the BJT $T_S$, the compensation voltage $V_{COM}$ represents a compensation current value $I_{COM}$, with which the comparator 38 compares the emitter current $I_e$. Analogously, the comparator 38 compares the emitter current $I_e$ with the compensation current value $I_{COM}$ deducted by a bias value $I_{BIAS}$ represented by the bias voltage $V_{BIAS}$.

Figure 3:
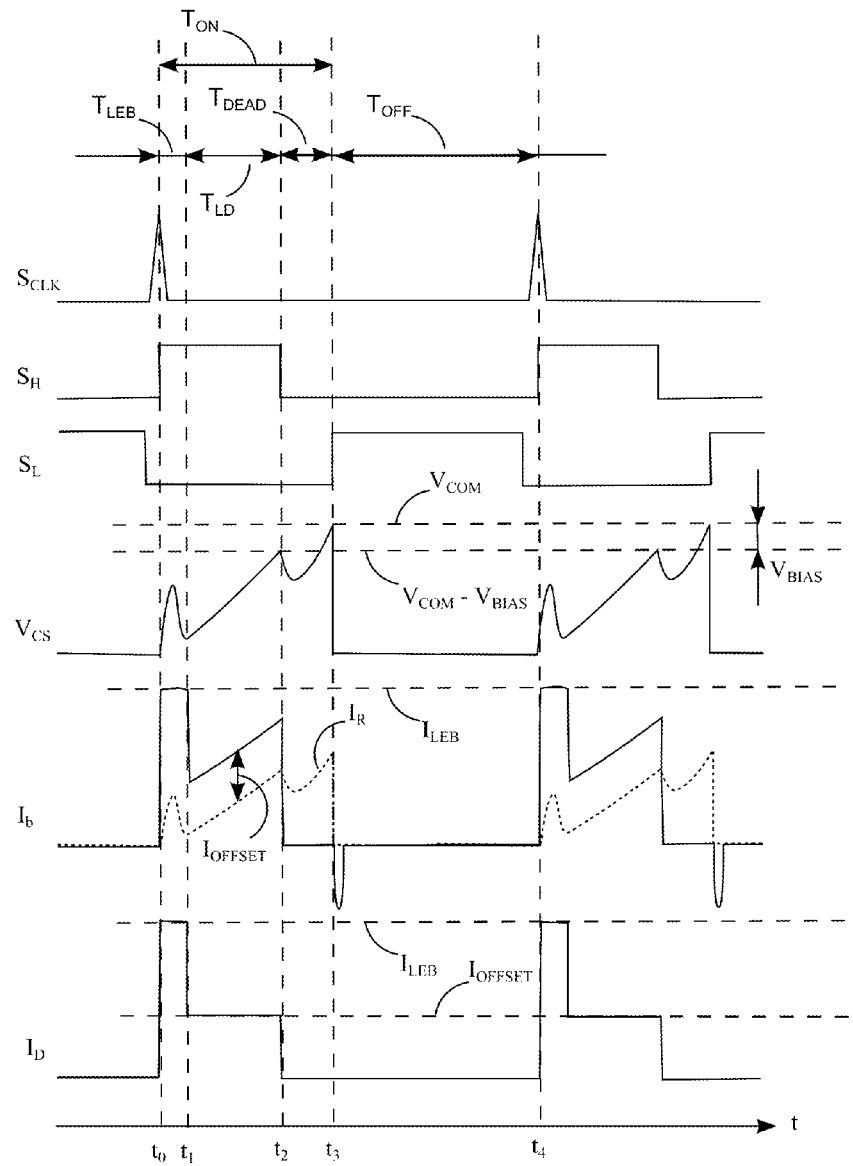
FIG. 3 illustrates some waveforms of the signals in FIG. 2.

FIG. 3 illustrates some waveforms of the signals in FIG. 2, where, from top to bottom, are the clock signal $S_{CLK}$, the signal $S_H$, the signal $S_L$, the current-sense voltage $V_{CS}$, the base current $I_b$ (flowing into BJT $T_S$ via the base electrode), and the offset current $I_D$. Suggestively, please reference FIG. 3 and FIG. 2 as well for the following explanation.

At the moment $t_0$, the clock signal $S_{CLK}$ renders the control logic 34 to make the signal $S_L$ "0" and the signal $S_H$ "1" sequentially, as shown in FIG. 3. In other words, the low-side driver 32 is first disabled, and the high-side driver 30 is then enabled to turn ON the BJT $T_S$. Meanwhile, as there starts some current flowing through the BJT $T_S$, the current-sense voltage $V_{CS}$ becomes positive and the BJT $T_S$ enters a period named ON time $T_{ON}$. A predetermined small time period right after the beginning of the ON time $T_{ON}$, marked in FIG. 3 from the moment $t_0$ to moment $t_1$, is called as leading edge blanking time $T_{LEB}$. During leading edge blanking time $T_{LEB}$, the offset current $I_D$ is a large constant $I_{LEB}$ and the high-side driver 30 uses the offset current $I_D$ alone to be the base current $I_b$ to drive the BJT $T_S$.

Starting from the moment $t_1$ when leading edge blanking time $T_{LEB}$ ends, the offset current $I_D$ changes to be a small constant $I_{OFFSET}$. Meanwhile, the high-side driver 30 combines the ratio current $I_R$ and the offset current $I_D$ to be the base current $I_b$ for keeping the BJT $T_S$ ON. In other words, the base current $I_b$ now is the sum of the ratio current $I_R$ and the offset current $I_D$. The current-sense voltage $V_{CS}$ ramps up over time as the transformer 14 in FIG. 1 energies, such that the ratio current $I_R$ and the base current $I_b$ rise as well.

At the moment $t_2$ when the current-sense voltage $V_{CS}$ exceeds the compensation voltage $V_{COM}$ deducted by bias voltage $V_{BIAS}$, the comparator 36 changes its output and the control logic 34 accordingly makes the signal $S_H$ "0" in logic, disabling the high-side driver 30. As the high-side driver 30 stops providing driving current to the BJT $T_S$, the base current $I_b$ is almost 0 A. The period of time between the two moments $t_1$ and $t_2$ is named as linear-driven time $T_{LD}$, hereinafter, during which the base current $I_b$ driving the BJT $T_S$ is generated according to the current-sense voltage $V_{CS}$, and the higher the current-sense voltage $V_{CS}$ the higher the base current $I_b$. In linear-driven time $T_{LD}$, the base current $I_b$ is about constant $I_{OFFSET}$ more than the ratio current $I_R$, as shown in FIG. 3.

A period of time starting from the moment $t_2$ to the moment $t_3$ in FIG. 3 is designated as dead time $T_{DEAD}$ when both the signals $S_L$ and $S_H$ are "0", disabling both the high-side driver 30 and the low-side driver 32. The base current $I_b$ is almost 0 A, and the base electrode of BJT $T_S$ is left floating. At the beginning of the dead time $T_{DEAD}$, the current-sense voltage $V_{CS}$ declines, responding to the quick vanishing of the base current $I_b$. Later on, the current-sense voltage $V_{CS}$ resumes the ramping up because some residue charges at the base electrode of the BJT $T_S$ starts being drained by the emitter electrode of the BJT $T_S$.

At the moment $t_3$ when the current-sense voltage $V_{CS}$ exceeds the compensation voltage $V_{COM}$, the output of the comparator 38 changes, and the control logic 34 switches the signal $S_L$ into "1" and keeps the signal $S_H$ as "0", terminating the dead time $T_{DEAD}$. The high-side driver 30 is disabled and the low-side driver 32 enabled to drain the charges on the base electrode of the BJT $T_S$, turning the BJT $T_S$ OFF. In one embodiment, a switch in the low-side driver 32 shorts the base electrode to the ground line GND. Thus, the base current $I_b$ suddenly becomes negative to pull down the voltage of the base electrode. When the voltage of the base electrode reaches 0V, the base current $I_b$ converges to 0 A quickly, as shown in FIG. 3.

The period of time starting from the moment $t_3$ to the moment $t_4$ when the signal $S_H$ is "0" is designated as OFF time $T_{OFF}$, because the base electrode is shorted to ground line GND and the BJT $T_S$ is constantly turned OFF. Hardly any current flows through the BJT $T_S$ and the current-sense voltage $V_{CS}$ is about 0V.

Contrary to the OFF time $T_{OFF}$, the time period between the moment $t_0$ and moment $t_3$ is designated as ON time $T_{ON}$ because of the considerable amount of conduction current flowing through the BJT $T_S$. The ON time $T_{ON}$ in FIG. 3 consists of the leading edge blanking time $T_{LEB}$, the linear-driven time $T_{LD}$, and the dead time $T_{DEAD}$.

In one embodiment, the bias voltage $V_{BIAS}$ is a constant. In another embodiment, it varies, determined by the compensation voltage $V_{COM}$. For example, the higher compensation voltage $V_{COM}$ the higher bias voltage $V_{BIAS}$.

By way of analyzing the results in FIG. 2 and FIG. 3, the embodiment of FIG. 2 can beneficially obtain the following achievements.

1. Good power saving: During the linear-driven time $T_{LD}$, the base current $I_b$ is constant $I_{OFFSET}$ higher than the ratio current $I_R$. Even although this constant $I_{OSFFSET}$ could be very large and workable, it is preferably designed to be as small as the one slightly keeping BJT $T_S$ working in a saturation mode. In other words, constant $I_{OSFFSET}$ could be small such that BJT driver 28 consumes little power.

2. Quick switching speed: During the leading edge blanking time $T_{LEB}$, the base current $I_b$ is a large constant $I_{LEB}$, which could quickly switch the BJT $T_S$ from a cut off mode to a saturation mode. This quick switching speed beneficially reduces switching loss of the BJT $T_S$, increasing the power conversion of the whole power supply.

3. Accurate current detection: When the ON time $T_{ON}$ ends at the moment $t_3$, the base current $I_b$ is 0 A, and the emitter current $I_e$, represented by the current-sense voltage $V_{CS}$, is exactly the same as the collector current $I_C$, which happens to be the very current flowing through the primary winding PRM of the transformer 14. Accordingly, the utilization of the current-sense voltage $V_{CS}$ at the moment $t_3$ for controlling the current passing through the primary winding PRM, as done in the embodiment of FIG. 2, will achieve an accurate result.

4. Variable length of the dead time $T_{DEAD}$: The length of the dead time $T_{DEAD}$ correlates to the current-sense voltage $V_{CS}$ and the bias voltage $V_{BIAS}$. Simply put, it is around the period of time for the current-sense voltage $V_{CS}$ to increase for about the bias voltage $V_{BIAS}$. In one embodiment where the bias voltage $V_{BIAS}$ is about a constant, the higher the line voltage $V_{LINE}$, the steeper the waveform of the current-sense voltage $V_{CS}$ during the dead time $T_{DEAD}$ and the shorter the dead time $T_{DEAD}$. In another embodiment where the bias voltage $V_{BIAS}$ varies along with the compensation voltage $V_{COM}$, which somehow represents how heavy the loading 23 is in the secondary side, the dead time $T_{DEAD}$ varies when the loading 23 changes.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a switched mode power supply, the switched mode power supply comprising a current-controllable device, the control method comprising:
    providing a driving current to turn ON the current-controllable device;
    detecting a conduction current passing through the current-controllable device; and
    controlling the driving current according to the conduction current;
    wherein, within an ON time of the current-controllable device, a value of the conduction current results in a corresponding value of the driving current such that the higher the conduction current the higher the driving current.

2. The control method as claimed in claim 1, further comprising:
    generating a ratio current in proportion to the conduction current;
    wherein the driving current differs with the ratio current by an offset value.

3. The control method as claimed in claim 1, further comprising:
    making the driving current a constant within a predetermined time period right after the current-controllable device is turned ON.

4. The control method as claimed in claim 1, further comprising:
    completely turning OFF the current-controllable device when the conduction current exceeds a compensation value.

5. The control method as claimed in claim 1, further comprising:
    providing a clock signal to periodically turn ON the current-controllable device.

6. A control apparatus for driving a current-controllable device, comprising:
    a driver for providing a driving current to the current-controllable device; and
    a signal converter for providing a control signal according to a conduction current passing through the current-controllable device;
    wherein the driving current is generated according to the control signal; and
    within an ON time of the current-controllable device, a value of the conduction current results in a corresponding value of the driving current such that the higher the conduction current the higher the control signal and the driving current.

7. The control apparatus as claimed in claim 6, wherein the signal converter is a transconductor for converting a current-sense voltage to a ratio current as the control signal, and the current sense voltage is in proportion to the conduction current.

8. The control apparatus as claimed in claim 7, wherein the driving current differs with the ratio current by an offset value.

9. The control apparatus as claimed in claim 7, wherein the driver has a high-side driver for providing the driving current according to the ratio current and an offset current.

10. The control apparatus as claimed in claim 6, further comprising a control logic and a low-side driver, wherein when the conduction current exceeds a compensation value the control logic makes the low-side driver turn OFF the current-controllable device.

11. The control apparatus as claimed in claim 10, wherein the compensation value is controlled by an output result from an output power source of a switched mode power supply.

12. A control method for a driver with a high-side driver and a low-side driver, commonly driving a power switch, the control method comprising: keeping the low-side driver disabled and using the high-side driver to provide to a control node of the power switch a driving current, so as to raise a voltage at the control node and turn ON the power switch; making the driver enter a dead time when the high-side and low-side drivers are both disabled, not driving the control node; terminating the dead time according to a conduction current passing through the power switch; and after the dead time, keeping the high-side driver disabled and using the low-side driver to provide to the control node another driving current, so as to lower the voltage and turn OFF the power switch.

13. The control method as claimed in claim 12, comprising:
    terminating the dead time when the conduction current exceeds a compensation value, by using the low-side driver to turn OFF the power switch.

14. The control method as claimed in claim 13, comprising: disabling both the high-side and low-side drivers to enter the dead time when the conduction current exceeds a compensation value deducted by a predetermined value.

15. The control method as claimed in claim 14, comprising: providing the predetermined value according to the compensation value.

16. The control method as claimed in claim 12, wherein the control method is apt to a switched mode power supply receiving an input line power source, and the length of the dead time correlates to a line voltage of the input line power source.

17. The control method as claimed in claim 12, wherein the length of the dead time correlates to a compensation value controlled by an output result from an output power source of a switched mode power supply.

18. A controller for driving a power switch, comprising:
a driver comprising:
 a high-side driver for turning ON the power switch by providing to a control node of the power switch a driving current to raise a voltage at the control node; and
 a low-side driver for turning OFF the power switch by providing to the control node another driving current to lower the voltage;
a control logic for controlling the driver; and
a condition decider coupled to the control logic, for terminating a dead time according to a conduction current passing through the power switch;
wherein during the dead time, both the high-side and low-side drivers are disabled, not driving the control node of the power switch.

19. The controller as claimed in claim 18, wherein the condition decider comprises:
a comparator for comparing the conduction current with a compensation value:
wherein the control logic makes the low-side driver turn the power switch OFF when the conduction current exceeds the compensation value, thereby terminating the dead time.

20. The controller as claimed in claim 18, wherein when the conduction current exceeds a compensation value deducted by a predetermined value, the control logic disables both the high-side and low-side drivers, thereby entering the dead time.

21. The controller as claimed in claim 20, wherein the compensation value is controlled by an output result from an output power source of a switched mode power supply.

22. The controller as claimed in claim 20, wherein the compensation value is controlled by an output result from an output power source of a switched mode power supply, and the predetermined value is determined by the compensation value.

23. The controller as claimed in claim 18, wherein the power switch is a current-controllable device.

24. The controller as claimed in claim 18, further comprising a clock generator for periodically making the high-side driver turn ON the power switch.

* * * * *